United States Patent
He (10) Patent No.: US 11,868,521 B2
(45) Date of Patent: Jan. 9, 2024

(54) METHOD AND DEVICE FOR DETERMINING GAZE POSITION OF USER, STORAGE MEDIUM, AND ELECTRONIC APPARATUS

(71) Applicant: Beijing Xiaomi Mobile Software Co., Ltd., Beijing (CN)

(72) Inventor: Li He, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 344 days.

(21) Appl. No.: 17/221,427

(22) Filed: Apr. 2, 2021

(65) Prior Publication Data

US 2021/0405742 A1 Dec. 30, 2021

(30) Foreign Application Priority Data

Jun. 30, 2020 (CN) .......................... 202010622072.5

(51) Int. Cl.
*G06F 3/01* (2006.01)
*G06F 3/04886* (2022.01)
*G06F 18/214* (2023.01)

(52) U.S. Cl.
CPC .......... *G06F 3/013* (2013.01); *G06F 3/04886* (2013.01); *G06F 18/214* (2023.01)

(58) Field of Classification Search
CPC ..... G06F 3/013; G06F 18/214; G06F 3/04886
See application file for complete search history.

(56) References Cited

U.S. PATENT DOCUMENTS

2015/0358594 A1* 12/2015 Marshall ................. G06F 3/013
345/419
2020/0128177 A1* 4/2020 Gotou .................. H04N 21/431

FOREIGN PATENT DOCUMENTS

CN 111046744 A 4/2020
WO WO 2015/187294 A1 12/2015

OTHER PUBLICATIONS

Extended European Search Report dated Sep. 27, 2021 in European Patent Application No. 21166294.5, 9 pages.

* cited by examiner

*Primary Examiner* — Matthew A Eason
*Assistant Examiner* — Chayce R Bibbee
(74) *Attorney, Agent, or Firm* — Oblon, McClelland, Maier & Neustadt, L.L.P.

(57) ABSTRACT

A method for determining a gaze position of a user is provided. The method can include obtaining a target distance from the display screen to a target user, and obtaining a user image of the target user, the user image includes: a global image, a head image, and an eye image, and the global image is an image of a target space in front of the display screen. The method can further include determining a first space where eyes of the target user are located from a plurality of preset subspaces within the target space based on the target distance and the global image, and determining a gaze position of the target user on the display screen corresponding to the first space and the user image of the target user, based on a preset correspondence among the subspaces, user images, and screen coordinates on the display screen.

16 Claims, 5 Drawing Sheets

METHOD AND DEVICE FOR DETERMINING GAZE POSITION OF USER, STORAGE MEDIUM, AND ELECTRONIC APPARATUS

CROSS-REFERENCE TO RELATED APPLICATIONS

This application claims the benefit of priority to Chinese Patent Application No. 202010622072.5 filed on Jun. 30, 2020, the contents of which are incorporated herein by reference in their entirety.

TECHNICAL FIELD

The present disclosure relates to the field of human-computer interaction, including to a method and device for determining a gaze position of a user, a storage medium, and an electronic apparatus.

BACKGROUND

With developments of smart terminals, a person may remotely interact with a terminal in various ways. A development direction of such remote interaction method is interacting with and controlling the terminal based on a gaze position of human eyes. The gaze position is a position of a focus point of a human eye on a display screen of a terminal when a user views the display screen.

SUMMARY

The present disclosure provides a method and device for determining a gaze position of a user, a storage medium, and an electronic apparatus.

According to a first aspect of the disclosure, there is provided a method for determining a gaze position of a user, which is applied to a terminal including a display screen. The method can include obtaining a target distance from the display screen to a target user, and obtaining a user image of the target user, where the user image includes: a global image, a head image, and an eye image, and the global image is an image of a target space in front of the display screen. The method can include determining a first space where eyes of the target user are located from a plurality of preset subspaces within the target space based on the target distance and the global image, and determining a gaze position of the target user on the display screen corresponding to the first space and the user image of the target user, based on a preset correspondence among the subspaces, user images, and screen coordinates on the display screen.

According to a second aspect of the disclosure, there is provided a device for determining a gaze position of a user, which is applied to a terminal with a display screen, and the device includes a processor and a storage device for storing computer executable instructions that when executed by the processor cause the processor to obtain a target distance from the display screen to a target user, obtain a user image of the target user, and the user image includes a global image, a head image, and an eye image, and the global image is an image of a target space in front of the display screen. Further, the processor can determine a first space where eyes of the target user are located from a plurality of preset subspaces within the target space based on the target distance and the global image, and determine a gaze position of the target user on the display screen corresponding to the first space and the user image of the target user, based on a preset correspondence among the subspaces, the user images, and screen coordinates on the display screen.

According to a third aspect of the disclosure, there is provided a non-transitory computer-readable storage medium having computer program instructions stored thereon, and the program instructions, when executed by a processor, implements steps of the method for determining a gaze position of a user provided in the first aspect of the present disclosure.

According to a fourth aspect of the disclosure, there is provided an electronic apparatus, at least including a processor and a memory for storing executable instructions that can run on the processor. When the processor is configured to run the executable instructions, the executable instructions execute the method for determining a gaze position of a user provided in the first aspect of the present disclosure.

It should be noted that the above general description and the following detailed description are merely explanatory and should not be construed as limiting of the disclosure.

BRIEF DESCRIPTION OF THE DRAWINGS

The accompanying drawings, which are incorporated in the specification and constitute a part of the specification, show some embodiments of the present disclosure. The drawings along with the specification explain the principles of the present disclosure.

DETAILED DESCRIPTION

Embodiments will be described in detail herein, examples of which are illustrated in the accompanying drawings. The following description refers to the same or similar elements in the different figures unless otherwise indicated. The embodiments described in the following embodiments do not represent all embodiments consistent with the present disclosure. Instead, they are merely examples of devices and methods consistent with aspects of the present disclosure as detailed in the appended claims.

Before describing a method for determining a gaze position of a user provided by the present disclosure, application scenarios involved in various embodiments of the present disclosure are first introduced. The application scenarios include a terminal with a display screen, and the terminal is provided with an infrared sensor and a camera device. Alternatively, the terminal with the display screen can also use an external infrared sensor and camera device, and the external infrared sensor and camera device need to transmit obtained data to the terminal with the display screen via Bluetooth or Wi-Fi and so on, which is not described in detail here. The infrared sensor and camera device may be a universal infrared sensor and camera on a smart hardware terminal. For example, the terminal can be a mobile terminal equipped with the infrared sensor and camera device, such as a smart phone, a tablet computer, a smart watch, a smart bracelet, PDA (Personal Digital Assistant) and so on, or it can be a fixed terminal, such as a desktop computer and a smart TV.

Figure 1:
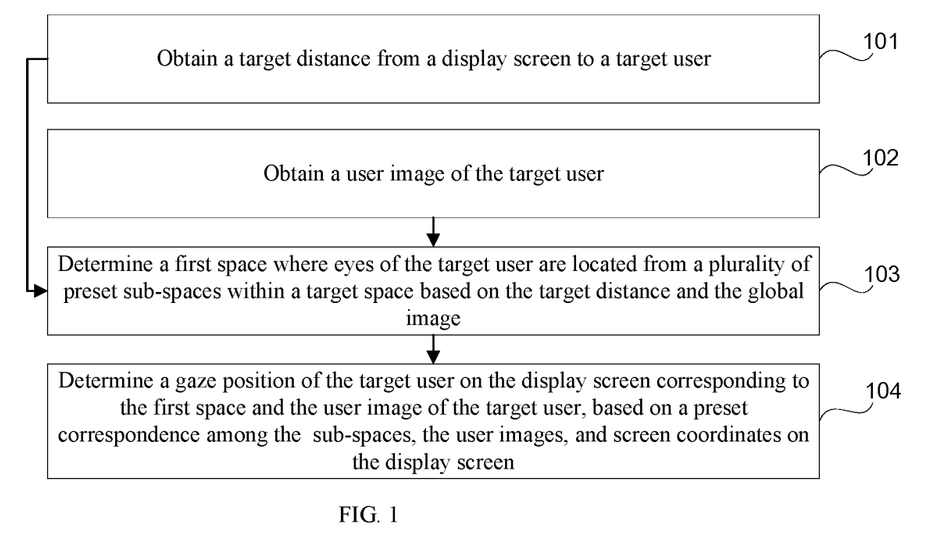
FIG. 1 is a flowchart of a method for determining a gaze position of a user according to some embodiments.

FIG. 1 is a flowchart of a method for determining a gaze position of a user according to some embodiments, which is applied to the terminal described in the above application scenario. As shown in FIG. 1, the method can include steps described below.

In step 101, a target distance from the display screen to a target user is obtained.

In step 102, a user image of the target user is obtained. The user image includes a global image, a head image, and an eye image. The global image is a plane image of a target space in front of the display screen.

In some embodiments of the present disclosure, the above method for determining a gaze position of a user is described through an example in which a smart TV is used as the terminal. For example, when a human eye control function of the smart TV is enabled, the smart TV can first obtain monitoring information in the target space in front of the smart TV by the camera device and/or infrared sensor, and select the target user from multiple users according to the monitoring information. The monitoring information may be a length of stay of the user, a distance of the user from the TV, or a standing time of the user. Based on this, the target user may be a user who stays the longest in front of the smart TV, a user who is closest to the smart TV, or a user who remains stationary for the longest time. After the target user is determined, an operation right of the smart TV is granted to the target user.

For example, the above expression of "an operation right of the smart TV is granted to the target user" actually means to enable a process of collecting the target distance and user image corresponding to the target user. The user image includes a global image, a head image, and an eye image, which are in three dimensions. The global image is a plane image of the target space in front of the smart TV. It can be understood that the plane image includes a portrait part and a background part of the target space. The eye image may be a high resolution image including the eyes of the target user. The head image may include the entire head of the target user. The head image is applied to coordinate prediction models described later, which can provide assistance to the analysis of a sight angle of the target user. The head image can be an image including the head that is obtained by performing image recognition on the global image and then performing interception. Therefore, the above-mentioned head image, global image and the eye image can be collected by a universal front camera in the smart TV or the mobile terminal. For example, a pixel requirement of the head image and the global image can be set to 12 million pixels, and an aspect ratio of the head image can be 1:1, and an aspect ratio of the global image can be 16:9. On the other hand, since the eye image is a core parameter for determining the gaze position of the user, the eye image can be obtained by a high-precision camera included in the camera device. A pixel requirement for the eye image is at least 48 million pixels, and an aspect ratio of the eye image can be 16:9.

As can be seen, in the embodiments of the present disclosure, the data used to determine the gaze position of the user can be collected by the universal camera device on the terminal, which solved the problem of increased hardware costs caused by collecting data through customized devices such as infrared emitting devices or wearable devices.

In step 103, a first space where eyes of the target user are located is determined from a plurality of preset subspaces within the target space based on the target distance and the global image. For example, the following method may be used to pre-set the plurality of subspaces: dividing the target space into a plurality of subspaces according to a shooting angle range and an effective shooting distance of an image capturing device. For example, a horizontal shooting angle range of the image capturing device can be divided in the horizontal direction at a first preset angle interval to obtain a plurality of first subspaces in the horizontal direction, a vertical shooting angle range of the image capturing device is divided in the vertical direction at a second preset angle interval to obtain a plurality of second subspaces in the vertical direction, and the effective shooting distance of the image capturing device is divided into third subspaces in a from-far-to-near direction at a preset distance interval, and subspaces obtained by intersecting and separating the first subspaces, the second subspaces and the third subspaces are determined as the subspaces of the target space.

For example, before the smart TV is on sale, the space is divided, based on the shooting angle range and effective shooting distance of the camera device, into subspaces by, for example, a test machine of the same model as the terminal, or a server used for development, during the development stage. For example, for a camera device with a horizontal shooting angle range of 120 degrees, a vertical shooting angle range of 60 degrees, and an effective shooting distance of 10 meters, the horizontal shooting angle range can be divided into nine horizontal measurement spaces h_position (i.e., the above-mentioned first subspace) of 0°, 15°, 30°, 45°, 60°, 75°, 90°, 105° and 120° in a clockwise direction at an interval of 15°. The vertical shooting angle range can be divided into five vertical measurement spaces v_position (i.e., the above-mentioned second subspace) of 60°, 45°, 30°, 15° and 0° from top to bottom at an interval of 15°. For the effective shooting distance, the effective shooting distance of 10 meters is divided into five distance positions (distance) (i.e., the above-mentioned third subspace) from far-to-near at an interval of 2 meters. With the above three parameters h_position, v_position and distance, a subspace can be defined. For example, when there are 9 h_positions, 5 v_positions and distances, the number of subspaces obtained by the three parameters n=9*5*5=225, then there are 225 corresponding coordinate prediction models.

In step 104, a gaze position of the target user on the display screen corresponding to the first space and the user image of the target user is determined based on a preset correspondence among the subspaces, the user images, and screen coordinates on the display screen. For example, in the development stage, a preset number of coordinate points (for example, 100 coordinate points) can be extracted from the countless coordinate points contained in the display screen according to a size of the display screen of the smart TV. These 100 coordinate points are the above-mentioned screen coordinates, and the screen coordinates can be interpreted as coordinate points. These screen coordinates can be evenly distributed on the display screen in a grid; the screen coordinates can also be interpreted as a sub-area, that is, the display screen can also be divided directly into a preset number of sub-areas, for example, 100 sub-areas, and an area coordinates of each sub-area are used as the screen coordinates herein.

For each subspace, there is a correspondence among the subspace, the user image, and the screen coordinate on the display screen. After the first space where the eyes of the target user are located and the user image of the target user are determined through steps 101 to 103, the screen coordinates corresponding to the first space and the user image of the target user can be determined based on the correspondence, and then the gaze position of the target user on the display screen can be determined according to the screen coordinates.

In addition, after step 104, corresponding operations can be performed on the gaze position of the target user on the display screen, for example, a control cursor on the display screen is moved to the gaze position, or a virtual button at the gaze position is selected, so that operation instructions issued by the user through eye movements, voice, or a remote control device of the smart TV can be performed.

In summary, through the technical solutions provided by the embodiments of the present disclosure, the target distance from the display screen to the target user can be obtained; and the user image of the target user can be obtained, and the user image includes the global image, the head image, and the eye image, and the global image is an image of the target space in front of the display screen, the first space where the eyes of the target user are located is determined from the plurality of preset subspaces within the target space based on the target distance and the global image and the gaze position of the target user on the display screen corresponding to the first space and the user image of the target user are determined based on the preset correspondence among the subspaces, the user images, and the screen coordinates on the display screen. The gaze position of the target user can be identified according to the collected user image and the user distance, so that the device cost is reduced while accuracy of identifying the gaze position of the target user is ensured. In this way, the identifying process of the gaze position of the user has good stability and avwide application scope, so that the user has good use experience.

Figure 2A:
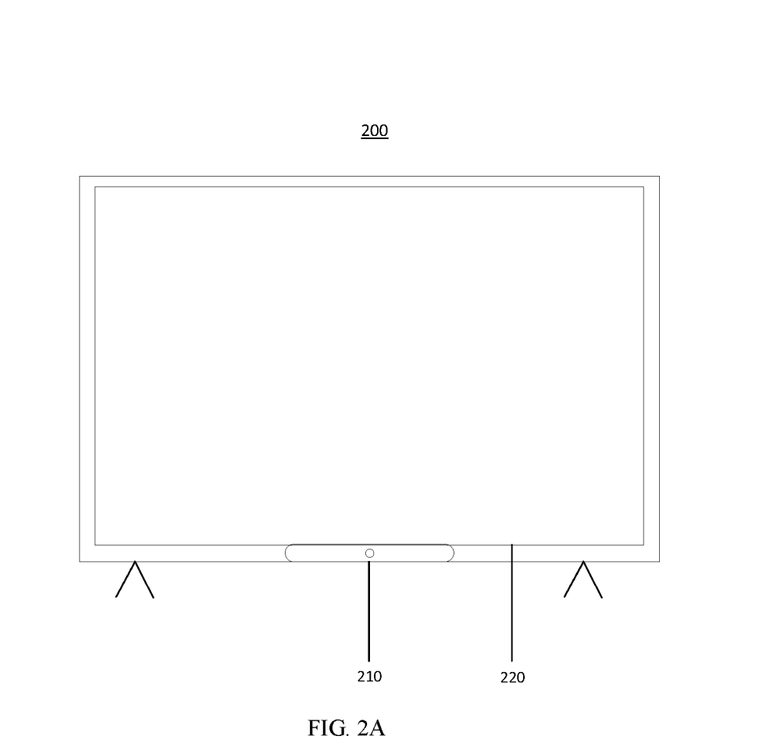
FIG. 2A is a schematic structural diagram showing a terminal according to some embodiments.

Illustratively, FIG. 2A is a schematic structural diagram showing a terminal according to some embodiments. As shown in FIG. 2A, the terminal is a smart TV 200 which includes a control device 210 and a display screen 220. The control device 210 is disposed at the center of the underpart of the smart TV (often referred to as a chin position).

Figure 2B:
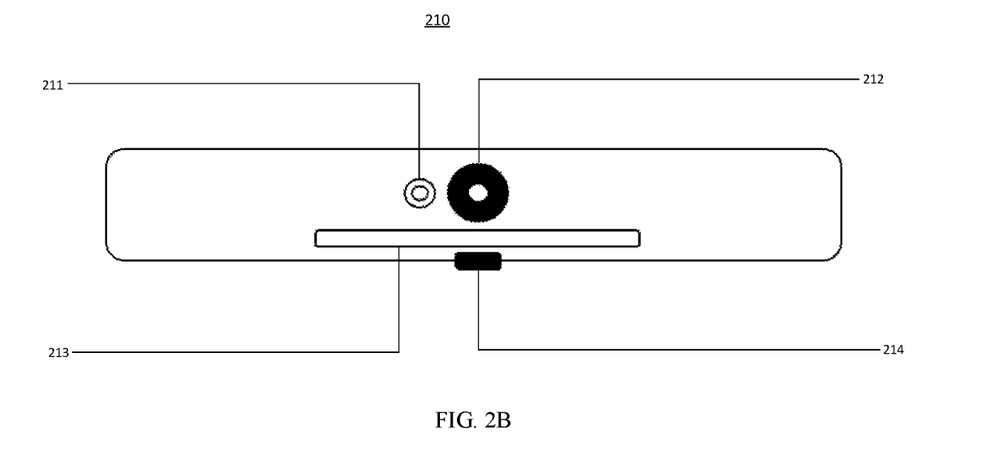
FIG. 2B is a schematic structural diagram showing a control device of a terminal according to some embodiments.

In addition, FIG. 2B is a schematic structural diagram showing a control device of the terminal according to some embodiments. As shown in FIG. 2B, the control device 210 includes an infrared sensor 211, a camera device 212, an indicator light 213, and a power button 214. For example, after a human eye control function of the terminal 200 is triggered by the user through voice commands and control commands of the remote device, etc., the infrared sensor 211 and the camera device 212 can be controlled to be enabled at the same time. The target distance from the display screen 220 to the target user can be obtained by the infrared sensor 211, and the user image of the target user is obtained by the camera device 212 at the same time.

Figure 2C:
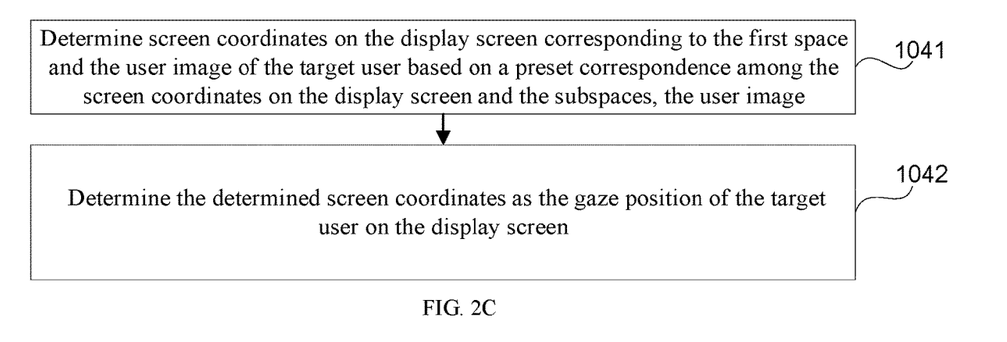
FIG. 2C is a flowchart showing a method for determining a gaze position as shown in FIG. 1.

FIG. 2C is a flowchart showing a method for determining a gaze position as shown in FIG. 1. As shown in FIG. 2C, such step 104 may include steps 1041 to 1042.

In step 1041, screen coordinates on the display screen corresponding to the first space and the user image of the target user are determined based on the preset correspondence among the screen coordinates on the display screen and the subspaces, the user image. The display screen is divided into a plurality of sub-areas in advance according to a size of the display screen, and coordinates of a preset position in each of the sub-areas are used as screen coordinates of that sub-area.

For example, step 1041 may include: determining a pre-trained coordinate prediction model for the first space; and inputting the user image of the target user into the coordinate prediction model to obtain the screen coordinates on the display screen corresponding to the user image of the target user. For each of the subspaces, a coordinate prediction model is trained based on the user image and screen coordinates of the gaze position of the user on the display screen.

Illustratively, the number of coordinate prediction models is consistent with the number of spatial positions. For example, in a case where a spatial position where the eyes of a test user are located are determined, an image sample (and its corresponding screen coordinates) of the test user at this time is determined. A combination of a plurality of groups of image samples of the user obtained based on the same spatial location and their corresponding screen coordinates is used as a training data set. A preset neural network model is trained through n different training data sets, and then n above-mentioned coordinate prediction models can be obtained. Based on the training process, the smart TV purchased and used by the user already contains n coordinate prediction models trained in advance, and each of the coordinate prediction models corresponds to one subspace.

For example, the following steps can be used to train the coordinate prediction model.

In step a, an initial coordinate prediction model is constructed for each of the subspaces. For example, each screen coordinate can be regarded as a class, and a process of determining a coordinate label corresponding to the user image can be implemented as a multi-class process, where each screen coordinate corresponds to a coordinate label, and each coordinate label corresponds to a class in the multi-class process. A neural network model can be used as the aforementioned initial coordinate prediction model to realize the multi-class process. The neural network model includes: a convolutional layer, a pooling layer, and a fully connected layer. The convolutional layer is configured to extract image features from the user image, and then obtain a feature vector matrix of each image. In the embodiments of the present disclosure, for the global image, the head image, and the eye image, different convolution kernels can be used to extract partial features. For example, for the eye image with the aspect ratio of 16:9 and 48 million pixels, a larger convolution kernel, for example, a convolution kernel containing a pixel matrix of 100*100, can be used for feature extraction.

In step b, a labeled training data set is obtained for that subspace.

In step c, the labeled training data set is inputted into the initial coordinate prediction model. The training data set includes a plurality of groups of training data, and each group of training data includes: a user image sample of a test user and a screen coordinate label corresponding to the user image sample, and the training data is labeled with the screen coordinate labels. When the user image samples are collected for any of the subspaces, eyes of the test user are located in that subspace. The screen coordinate labels represent screen coordinates corresponding to the gaze position of the test user on the display screen when the user image samples are collected, and the user image samples include: global image samples, head image samples, and eye image samples.

For example, before the initial coordinate prediction model, a large number of user image samples are collected as input side training data in the above training data. The user image samples also include global image samples, head image samples, and eye image samples. In order to ensure the diversity of training data, in the embodiments of the present disclosure, in addition to the above-mentioned user image samples, each training data also has a user portrait of the test user. The user portrait may include: user identification (ID), age, gender, race and the like. The training data is selected so that the training data set corresponding to the same subspace contains user image samples of test users with different user IDs, different ages, different genders, and different races. It should be noted that, one subspace corresponds to one coordinate prediction model if the user portrait is not considered, while one subspace corresponds to multiple coordinate prediction models if the user portrait is added, and each of the coordinate prediction models corresponds to one type of the user portrait. In this case, the method for determining the gaze position of the user provided by this embodiment further includes the following steps: obtaining a user portrait of the target user according to registration information of the user; classifying the user portrait of the target user to obtain a class of the user portrait. In the above step 1041, it is necessary to determine the screen coordinates on the display screen corresponding to the first space and the user image of the target user based on the correspondence among the screen coordinates on the display screen and the preset subspaces, the user image, the class of the user portrait.

It can be seen that the incorporation of the user portrait can increase the pertinence and accuracy of screen coordinate prediction, and further increase the accuracy of determining the gaze position of the user.

For example, with respect to the output side training data in the above training data, the display screen of the smart TV may be divided into 100 screen coordinates in advance, and these screen coordinates may be labeled on the display screen. After that, the test user is positioned in each of the above-mentioned subspaces to gaze at the 100 screen coordinates, and the global images, head images and eye images when the test user gazes at each screen coordinate are recorded to generate the image samples of the user, while the screen coordinates specified by the test user are recorded. It should be noted that the above expression "the test user is positioned in each of the aforementioned n subspaces" means that the eyes of the test user are in this subspace. Since the human eye is not a machine, the focus point of the test user's gaze is not necessary to fall accurately within each subspace herein, and a certain range of deviation is allowed between the focus point of the test user's gaze and the subspace. Each of screen coordinates corresponds to a unique coordinate label, and the correspondence between the user image sample and the coordinate label can be recorded in the form of (image_id, label). In addition, the screen coordinates can be used for characterizing an accurate position corresponding to a coordinate point, or can be used for characterizing an area within a preset range around the coordinate point.

In step d, an obtained prediction result is compared with a labeled value, and parameters of the initial coordinate prediction model are adjusted according to the comparison result until the model converges to obtain the coordinate prediction model which has been trained.

For example, in the model training process, the number of convolution kernels in the convolution layer can be determined according to the actual training situation, and the convolution kernel parameters can be updated. The pooling layer is used for reducing the dimensions of the feature vector matrix to avoid overfitting the training data. In the embodiments of the present disclosure, a maximum value in a sampling area in each of the above three types of images can be used as a sampling feature value. By using the Max_pooling (maximum pooling operation) technology, a 2*3 sampling matrix is used to reduce the dimension of the feature vector matrix of the user image by a multiple of 2. For example, as a result of the process of reducing the dimension, the N*N feature vector matrix is reduced to (N−m)*(N−m). The fully connected layer further includes a convolutional layer. After a feature vector matrix with highly concentrated features is obtained by means of the convolution operation of the convolutional layer and the dimension reduction operation of the pooling layer, further convolution operations are performed on the highly concentrated feature vector matrix by a softmax function corresponding to the convolution layer contained in the fully connected layer, to obtain the final classification result.

In step 1042, the determined screen coordinates are determined as the gaze position of the target user on the display screen. For example, after the user image is used as the input of the coordinate prediction model, the output of the coordinate prediction model is actually a prediction probability corresponding to each screen coordinate among the multiple screen coordinates. The prediction probability is used for characterizing a probability that the eyes of the target user in the target image are at each of the aforementioned screen coordinates. After the user image is input into the target coordinate prediction model, the classification result output by the target coordinate prediction model is obtained, and the classification result is actually a prediction probability that the user image corresponds to each of the screen coordinates. For example, 100 screen coordinates correspond to 100 prediction probabilities.

The screen coordinates with the highest prediction probability among these 100 screen coordinates are determined, which are the target coordinates corresponding to the user image. The target coordinates are on the display screen of the smart TV and can clearly indicate the position of the display screen where the target user is currently gazing. In another embodiment of the present disclosure, while determining the gaze position, another image recognition can be performed on the user image (or other types of user images obtained at the same time as the user image, for example, consecutive multiple eye images of the target user) to determine the different eye actions performed by the target user. The eye action may include: blinking, closing eyes, and gazing. After determining the gaze position and the eye action, an operation instruction can be determined according to a binding relationship among the gaze position, the eye action and the operation instruction, and then an operation corresponding to the operation instruction can be executed by the smart TV.

Exemplarily, after step 1042, the method may further include step I to II.

In step I, a target coordinate label and the user image corresponding to the target coordinates are collected as real-time operation data corresponding to the first subspace.

In step II, when a preset amount of real-time operation data is collected, the target coordinate prediction model is trained based on the preset amount of real-time operation data to update the target coordinate prediction model.

For example, after performing a corresponding operation by the gaze position of the target user on the display screen, the parameters involved in the process of identifying the gaze position by the above steps 101 to 104 can be collected, namely, the target coordinate label, the user image and the first space. The target coordinate label and the user image may be saved as the real-time operation data corresponding to the first sub-subspace. As the target user uses the smart TV, when the real-time operation data corresponding to a certain subspace reaches a certain amount (that is, the above-mentioned preset amount), the trained coordinate prediction model corresponding to the subspace is updated by the preset amount of real-time operation data to improve the applicability of the coordinate prediction model for the target user. Or, in another embodiment, a calibration game for collecting the real-time operation data may be provided in the smart TV system. The steps of data collection by the calibration game include determining the gaze position of the target user on the display screen through a process similar to the above steps 101 to 103, outputting the gaze position so that the target user can determine whether the gaze position is accurate, and when the user determines that the gaze position is accurate, recording the user image and the coordinate label generated in the process as the real-time operation data corresponding to the subspace where the target user is located. It should be noted that the model update process in step 106 and the model training process in step 104 can be executed by the terminal, or, in an embodiment, can be executed by a cloud computing platform that is connected with and performs the data interaction with the aforementioned terminal. And after the execution ends, the execution result (trained model) is sent to the terminal.

Figure 3:
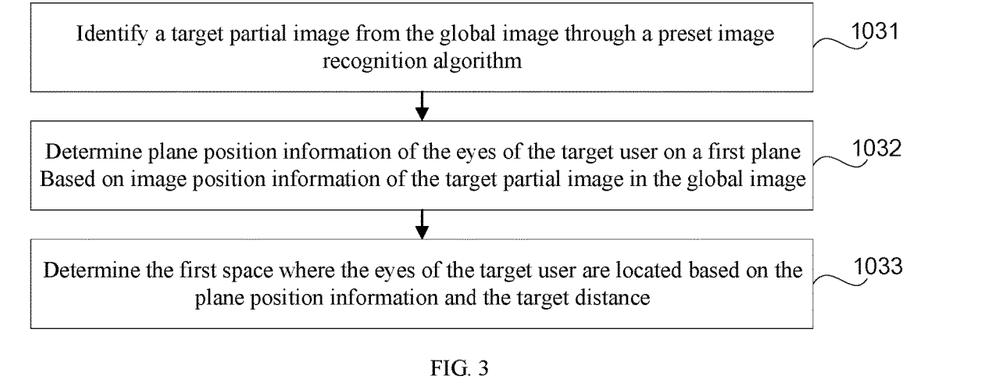
FIG. 3 is a flowchart showing a method for determining the space as shown in FIG. 2.

FIG. 3 is a flowchart showing a method for determining a space as shown in FIG. 2. As shown in FIG. 3, step 103 may include steps 1031 to 1033.

In step 1031, a target partial image is identified from the global image through a preset image recognition algorithm, and the target partial image contains the eyes of the target user. The target partial image contains the eyes of the target user.

In step 1032, plane position information of the eyes of the target user on a first plane is determined according to image position information of the target partial image in the global image. The first plane and a second plane where the display screen is located are parallel. The distance between the first plane and the second plane is the target distance.

For example, the image recognition algorithm may be an image recognition model obtained by training a preset machine learning model (for example, a neural network model, a support vector machine model, a linear regression model, etc.) through global image samples and partial image samples. The global image is used as an input of the image recognition model to get the target partial image and image location information output by the image recognition model. The image position information is used for characterizing the position of the target partial image in the global image, and the target distance is used for characterizing a position of the global image relative to the first plane. Therefore, with a position where the first plane is located as a reference, the plane position information of the eyes of the target user on the first plane can be determined according to the image position information and the target distance.

In step 1033, the first space where the eyes of the target user are located is determined based on the plane position information and the target distance. For example, the plane position information actually corresponds to the aforementioned horizontal measurement space h_position (corresponding to the first subspace) and vertical measurement space v_position (corresponding to the second subspace). In step 1033, the h_position parameter and the v_position parameter may be directly represented by the horizontal coordinate value and the vertical coordinate value in the three-dimensional coordinate. Alternatively, the horizontal coordinate value and the vertical coordinate value may be converted into the current horizontal shooting angle and vertical shooting angle of the camera device by using the position where the camera device is located as reference coordinates. The subspace (that is, the first space) where the eyes of the target user are located in this target space is obtained in conjunction with the horizontal shooting angle, the vertical shooting angle and the target distance.

Figure 4A:
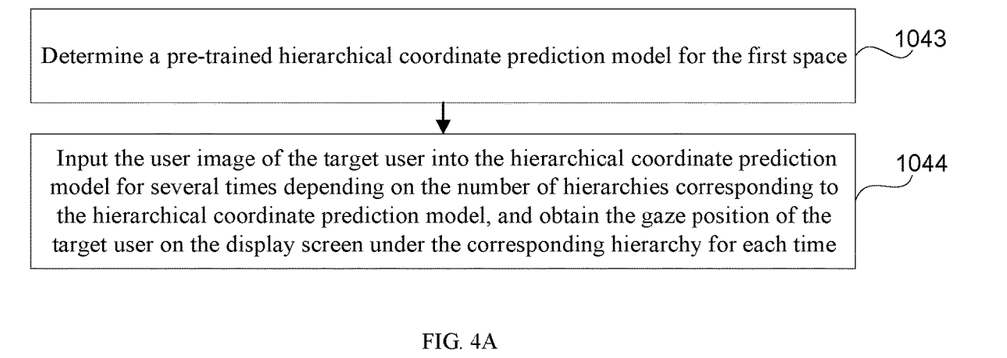
FIG. 4A is a flowchart showing a method for determining a gaze position as shown in FIG. 1.

FIG. 4A is a flowchart showing a method for determining a gaze position as shown in FIG. 1. As shown in FIG. 4A, step 104 may include steps 1043 to 1044.

In step 1043, a pre-trained hierarchical coordinate prediction model for the first space is determined. Each subspace has a pre-trained hierarchical coordinate prediction model that has been trained based on the user image, screen coordinates of the gaze position of the user on different hierarchies of the display screen and a plurality of preset hierarchies.

In step 1044, the user image of the target user is inputted into the hierarchical coordinate prediction model for several times based on the number of hierarchies corresponding to the hierarchical coordinate prediction model, and the gaze position of the target user on the display screen under the corresponding hierarchy is obtained for each time. The larger the number of hierarchies, the more sub-areas into which the display screen is divided.

In another embodiment of the present application, a definition of a hierarchy can also be added to the screen coordinates. For example, a preset iterative division scheme can be used to divide the display screen into multiple areas. For example, the display screen can be equally divided into four areas A, B, C, and D, then further division is performed on each area (for example, the A area is equally divided into four sub-areas A1, A2, A3, and A4), and then a smaller area is obtained for each sub-area, until each divided area coincides with the area corresponding to each of screen coordinates, and the areas divided by each iteration do not overlap. Each area division defines one hierarchy, for example, the four areas of A, B, C, and D belong to one hierarchy, and the four sub-areas of A1, A2, A3, and A4 (also including sub-areas of the B area) belong to one hierarchy. The above-mentioned number of hierarchies is equal to the number of iterations performed in the iterative division scheme.

Figure 4B:
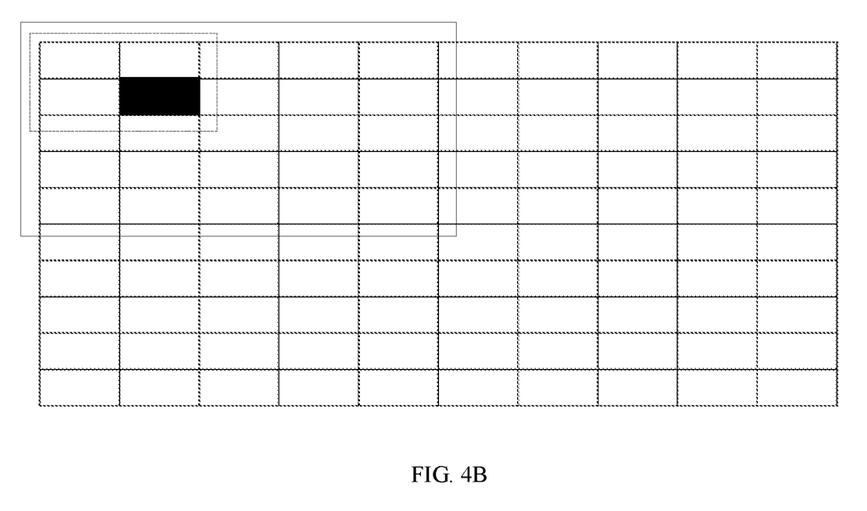
FIG. 4B is a schematic diagram showing a display screen division process according to FIG. 4A.

For example, FIG. 4B is a schematic diagram showing a display screen division process according to FIG. 4A, where the plane shown in FIG. 4B is a plane of the display screen that is subject to gridding processing, and the above-mentioned iterative division scheme can be used to divide the plane. As shown in FIG. 4B, the number of hierarchies obtained is 3, where a first hierarchy includes: A area (upper left), B area (lower left), C area (upper right), and D area (lower right). The outer dotted line indicates the A area. A second hierarchy in the A area includes: A1 sub-area (upper left), A2 sub-area (lower left), A3 sub-area (upper right), and A4 sub-area (lower right). The inner dotted line in FIG. 4B represents the A1 sub-area. The sub-areas divided in the third hierarchy coincide with the screen area represented by the screen coordinates, which is represented by a black solid rectangular area in the FIG. 4B.

For example, a training process for the hierarchical coordinate prediction model can be: for certain training data, the user image of user A and the gaze position coordinates of user A on the first hierarchy of the display screen (for example: the position coordinates of the area A may be the position coordinates of the center position of the area within the outermost dotted line) are input to the model for a first training, during implementation, the number of classifications can be reduced by the fully connected layer so that a target dimension is the number of areas divided by the first hierarchy (In this embodiment, there can be four areas (A, B, C, D), that is, the number is 4). Then, the user image of user A and the gaze position coordinates of user A on the second hierarchy of the display screen (for example: the screen coordinates corresponding to the A1 sub-area, which may be the screen coordinates of the center position of the area within the innermost dotted line) can be input to the model for a second training, during implementation, the number of classifications can be reduced by the fully connected layer so that the target dimension is the number of areas divided by the second hierarchy (in this embodiment, it may be the areas into which the four areas A, B, C, D are divided, respectively, that is, the number is 16).

Then, the user image of user A and the screen coordinates corresponding to the gaze position of user A in the third hierarchy of the display screen are input into the model for a third training, the target dimension corresponding to the last hierarchy can be the number of screen coordinates with the smallest unit into which the display screen is divided. The initial coordinate prediction model is trained in the above-mentioned training method by means of a plurality of groups of training data similar to the above-mentioned training data to obtain the trained hierarchical coordinate prediction model.

For example, based on the hierarchical coordinate prediction model trained by the above training method, step 1044 may include: determining a first gaze position by inputting the user image of the target user to the hierarchical coordinate prediction model to obtain the screen coordinates (for example, the screen coordinates corresponding to area A) of the target user on the display screen under the first hierarchy; and determining a second gaze position by inputting the user image of the target user to the hierarchical coordinate prediction model again to obtain the screen coordinates (for example, the screen coordinates corresponding to area B2) of the target user on the display screen under the second hierarchy, and determining the second gaze position as the finally determined gaze position of the user. This process can be understood as obtaining an approximate range of the gaze position of the target user after the first input process, and then narrowing down the range layer by layer in the subsequent input processes, and finally obtaining an accurate range.

After the gaze position is obtained each time, the operation cursor on the display screen can be moved to the gaze position. Taking FIG. 4B as an example, after the user image of the target user is obtained and the user image is inputted to the hierarchical coordinate prediction model, the hierarchical coordinate prediction model will sequentially output three screen coordinates, that is, the screen coordinates of the preset position (such as the center position) of the screen area within the outermost dotted line in FIG. 4B, the screen coordinates of the preset position (such as the center position) of the screen area within the innermost dotted line in FIG. 4B, and the screen coordinates of the actual gaze position of the user (the screen coordinates corresponding to the screen area represented by the black rectangular area in FIG. 4B). The moving process of the operation cursor will pass through these three screen coordinates in turn.

It can be seen that in this way, the movement of the operation cursor will include a gradual movement trajectory, and it is avoided that the operation cursor jumps directly from the initial position to the gaze position of the user, which improves the aesthetics of interaction and thus improves the user experience. In addition, during the training process, the prediction probability of each class of screen label are iteratively calculated layer by layer according to the hierarchy label corresponding to the training data of each output terminal, which can also improve the efficiency of the coordinate prediction model convergence and reduce the parallelism of the coordinate prediction model training process.

In summary, through the technical solutions provided by the embodiments of the present disclosure, the target distance from the display screen to the target user can be obtained, and the user image of the target user can be obtained, where the user image includes the global image, the head image, and the eye image, and the global image is the image of the target space in front of the display screen; the first space where the eyes of the target user are located is determined from the plurality of preset subspaces within the target space based on the target distance and the global image, and the gaze position of the target user on the display screen corresponding to the first space and the user image of the target user are determined based on the correspondence among the screen coordinates on the display screen and the preset subspaces, the user image. The gaze position of the target user can be identified based on the collected user image and the user distance, so that the device cost is reduced while accuracy of identifying the gaze position of the target user is ensured. In this way, the identifying process of the gaze position of the user has good stability and avwide application scope, so that the user has good use experience.

Figure 5:
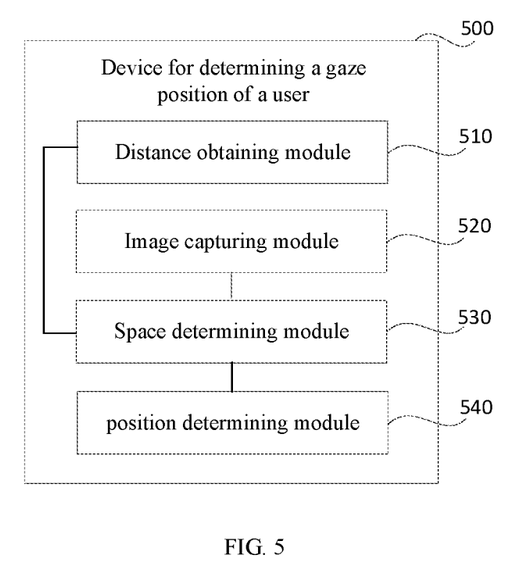
FIG. 5 is a block diagram showing a device for determining a gaze position of a user according to some embodiments.

FIG. 5 is a block diagram showing a device for determining a gaze position of a user according to some embodiments, which is applied to the terminal described in the above application scenarios. As shown in FIG. 5, the device 500 includes a distance obtaining module 510, an image capturing module 520, a space determining module 530 and a position determining module 540. Of course, it should be understood that one or more of the modules described in this disclosure can be implemented by hardware, such as circuitry.

The distance obtaining module 510 is configured to obtain a target distance from the display screen to a target user.

The image capturing module 520 is configured to obtain a user image of the target user. The user image includes a global image, a head image, and an eye image, and the global image is an image of the target space in front of the display screen.

The space determining module 530 is configured to determine a first space where eyes of the target user are located from a plurality of preset subspaces within the target space based on the target distance and the global image.

The position determining module 540 is configured to determine a gaze position of the target user on the display screen corresponding to the first space and the user image of the target user, based on a preset correspondence among the subspaces, the user image, and screen coordinates on the display screen.

In some embodiments of the present disclosure the position determining module 540 is configured to determine screen coordinates on the display screen corresponding to the first space and the user image of the target user based on the preset correspondence among the subspaces, the user images, and the screen coordinates on the display screen. The display screen is divided into a plurality of sub-areas in advance according to the size of the display screen, and coordinates of a preset position in each of the sub-areas are used as screen coordinates of that sub-area. The position determining module 540 can further determine the determined screen coordinates as the gaze position of the target user on the display screen.

In some embodiments of the present disclosure the position determining module 540 is configured to determine a pre-trained coordinate prediction model for the first space; each of the subspaces has a pre-trained coordinate prediction model that has been trained based on the user image and screen coordinates of the gaze position of the user on the display screen, and obtain the screen coordinates on the display screen corresponding to the user image of the target user by inputting the user image of the target user into the coordinate prediction model.

In some embodiments of the present disclosure the following method is used for training the coordinate prediction model constructing an initial coordinate prediction model for each of the subspaces, and obtaining a labeled training data set for the subspace. The labeled training data set includes a plurality of groups of training data, and each group of training data includes user image samples of a test user and screen coordinate labels corresponding to the user image samples, and the training data is labeled with the screen coordinate labels. When the user image samples are collected for any of the subspaces, eyes of the test user are in that subspace, the screen coordinate labels represent screen coordinates corresponding to the gaze position of the test user on the display screen when the user image samples are collected, and the user image samples include: global image samples, head image samples, and eye image samples. The method can further include inputting the labeled training data set into the initial coordinate prediction model, and comparing an obtained prediction result with the labeled value, and adjusting parameters of the initial coordinate prediction model according to the comparison result until the model converges to obtain the coordinate prediction model which has been trained.

In some embodiments of the disclosure the following method is used for setting the plurality of subspaces and dividing the target space into the plurality of subspaces according to a shooting angle range and an effective shooting distance of an image capturing device.

In some embodiments of the disclosure the following method is used for setting the plurality of subspaces and dividing a horizontal shooting angle range of the image capturing device in a horizontal direction at a first preset angle interval to obtain a plurality of first subspaces in the horizontal direction, and dividing a vertical shooting angle range of the image capturing device in a vertical direction at a second preset angle interval to obtain a plurality of second subspaces in the vertical direction. The method can additionally include dividing the effective shooting distance of the image capturing device into third subspaces in a from-far-to-near direction at a preset distance interval, and determining subspaces obtained by intersecting and separating the first subspaces, the second subspaces, and the third subspaces as the subspaces into which the target space is divided.

In some embodiments of the present disclosure the space determining module 530 is configured to identify a target partial image from the global image through a preset image recognition algorithm, where the target partial image includes the eyes of the target user, determine plane position information of the eyes of the target user on a first plane according to image position information of the target partial image in the global image, where the first plane and a second plane where the display screen is located are parallel, an determine the first space where the eyes of the target user are located based on the plane position information and the target distance.

In some embodiments of the present disclosure the position determining module 540 is configured to determine a pre-trained hierarchical coordinate prediction model for the first space, where each of the subspaces has a pre-trained hierarchical coordinate prediction model that has been trained based on the user image, screen coordinates of the gaze position of the user on the display screen and a plurality of preset hierarchies, and based on the number of hierarchies corresponding to the hierarchical coordinate prediction model, inputting the user image of the target user into the hierarchical coordinate prediction model for several times, and obtaining the gaze position of the target user on the display screen under the corresponding hierarchy for each time. The larger the number of hierarchies, the more sub-areas into which the display screen is divided.

In summary, through the technical solutions provided by the embodiments of the present disclosure, the target distance from the display screen to the target user can be obtained, and the user image of the target user can be obtained, and the user image includes the global image, the head image, and the eye image, and the global image is an image of target space in front of the display screen. The first space where the eyes of the target user are located is determined from the plurality of preset subspaces within the target space based on the target distance and the global image; and the gaze position of the target user on the display screen corresponding to the first space and the user image of the target user is determined based on the preset correspondence among the subspaces, the user image, and the screen coordinates on the display screen. The gaze position of the target user can be identified based on the collected user image and the user distance, so that the device cost is reduced while accuracy of identifying the gaze position of the target user is ensured. In this way, the identifying process of the gaze position of the user has good stability and avwide application scope, so that the user has good use experience.

Figure 6:
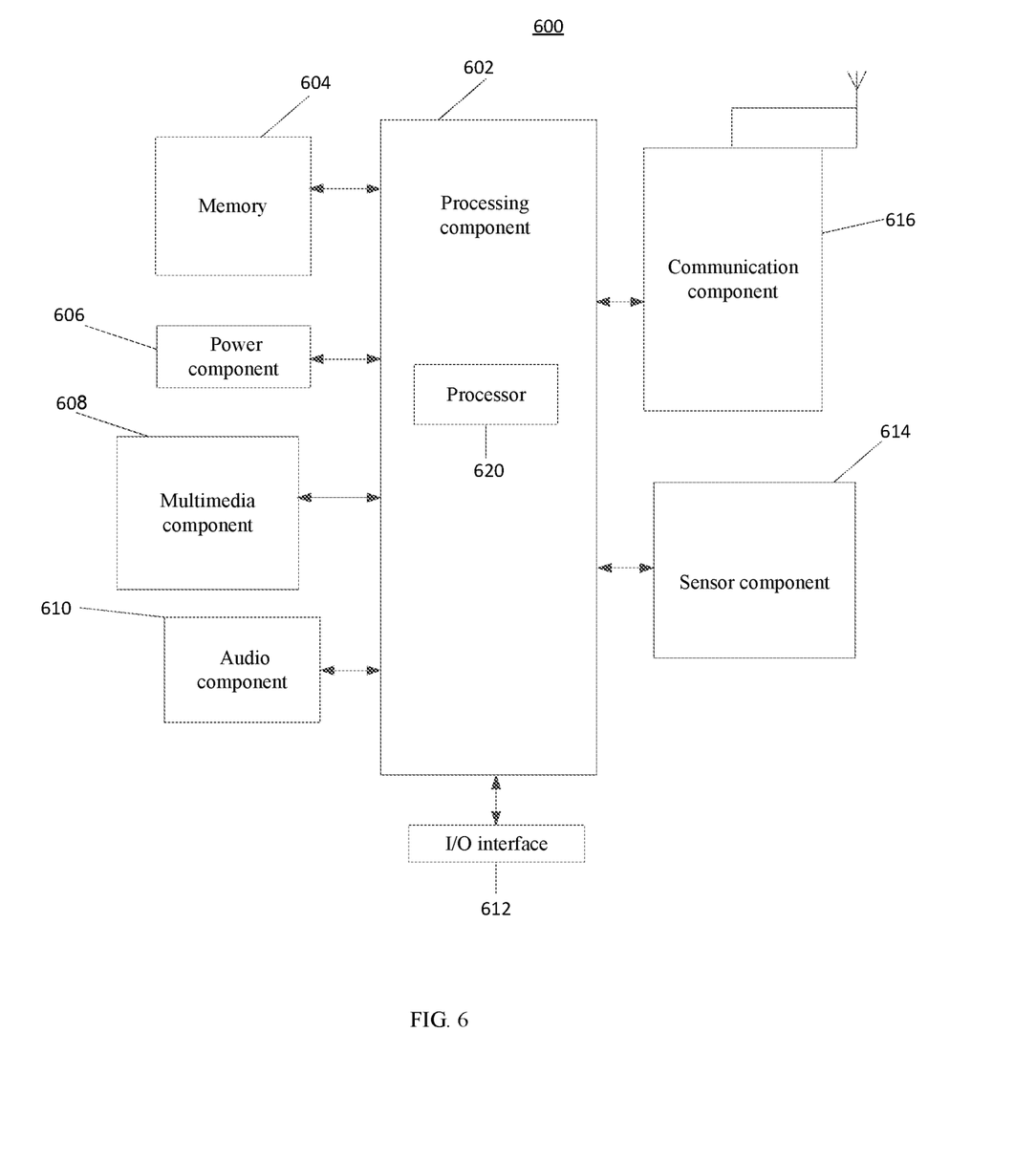
FIG. 6 is a block diagram showing an electronic apparatus according to some embodiments.

FIG. 6 is a block diagram showing an electronic apparatus according to some embodiments. For example, the electronic apparatus 600 may be, for example, a smart TV, a mobile phone, a computer, a digital broadcasting terminal, a messaging device, a game console, a tablet device, a medical device, a fitness device, a personal digital assistant, and other terminals.

Referring to FIG. 6, the electronic apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operations of the electronic apparatus 600, such as the operations associated with display, telephone calls, data communications, camera operations, and recording operations. The processing component 602 can include one or more processors 620 to execute instructions to perform all or part of the steps in the above described methods. Moreover, the processing component 602 can include one or more modules to facilitate the interaction between the processing component 602 and other components. For example, the processing component 602 can include a multimedia module to facilitate the interaction between the multimedia component 608 and the processing component 602. The processor can execute any of the above mentioned method for determining a gaze position of the user.

The memory 604 is configured to store various types of data to support the operation of the electronic apparatus 600. Examples of such data include instructions for any application or method operated on apparatus 600, such as the contact data, the phone book data, messages, pictures, videos, and the like. The memory 604 can be implemented by any type of volatile or non-volatile storage device, or a combination of volatile storage device and non-volatile storage device, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the electronic apparatus 600. The power component 606 can include a power management system, one or more power sources, and other components associated with the generation, management, and distribution of power in the electronic apparatus 600.

The multimedia component 608 includes a screen providing an output interface between the electronic apparatus 600 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. When the electronic apparatus 600 is in an operation mode, such as a photographing mode or a video mode, the front camera and/or the rear camera can receive external multimedia datum. Each of the front camera and the rear camera may be a fixed optical lens system or have focus and optical zoom capability.

The audio component 610 is configured to output and/or input an audio signal. For example, the audio component 610 includes a microphone (MIC) configured to receive an external audio signal when the electronic apparatus 600 is in an operation mode, such as a call mode, a recording mode, and a voice recognition mode. The received audio signal may be further stored in the memory 604 or sent via the communication component 616. In some embodiments, the audio component 610 also includes a speaker for outputting the audio signal.

The I/O interface 612 provides an interface between the processing component 602 and peripheral interface modules, such as a keyboard, a click wheel, buttons, and the like. These buttons may include, but are not limited to, a home button, a volume button, a starting button, and a locking button.

The sensor component 614 includes one or more sensors for providing status assessments of various aspects of the electronic apparatus 600. For example, the sensor component 614 can detect an open/closed status of the electronic apparatus 600, relative positioning of components, such as the display and the keypad of the electronic apparatus 600.

The sensor component 614 can also detect a change in position of one component of the electronic apparatus 600 or the electronic apparatus 600, the presence or absence of user contact with the electronic apparatus 600, an orientation, or an acceleration/deceleration of the electronic apparatus 600, and a change in temperature of the electronic apparatus 600. The sensor component 614 can include a proximity sensor configured to detect the presence of nearby objects without any physical contact. The sensor component 614 can also include a light sensor, such as a CMOS or CCD image sensor, configured to use in imaging applications. In some embodiments, the sensor component 614 can also include an accelerometer sensor, a gyroscope sensor, a magnetic sensor, a pressure sensor, or a temperature sensor.

The communication component 616 is configured to facilitate wired or wireless communication between the electronic apparatus 600 and other devices. The electronic apparatus 600 can access a wireless network based on any communication standard, such as Wi-Fi, 2G or 3G, or a combination of 2G and 3G. In some embodiments, the communication component 616 receives broadcast signals or broadcast associated information from an external broadcast management system via a broadcast channel. In some embodiments, the communication component 616 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the electronic apparatus 600 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components.

In some embodiments, there is also provided a non-transitory computer-readable storage medium including instructions, such as a memory 604 including instructions executable by the processor 620 of the electronic apparatus 600 to perform the above described method. For example, the non-transitory computer readable storage medium may be a ROM, a random access memory (RAM), a CD-ROM, a magnetic tape, a floppy disc, and an optical data storage device.

In another embodiment, there is also provided a computer program product. The computer program product includes a computer program that can be executed by a programmable device. The computer program has a code portion for executing the above-mentioned method for determining a gaze position of a user when executed by the programmable device In summary, the present disclosure can identify the gaze position of the user based on the collected user image and the user distance, so that the device cost is reduced while accuracy of identifying the gaze position of the target user is ensured. In this way, the identifying process of the gaze position of the user has good stability and avwide application scope, so that the user has good use experience.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope of the present disclosure. The scope of the present disclosure is limited only by the appended claims.

What is claimed is:

1. A method for determining a gaze position of a user that is applied to a terminal with a display screen, and the method comprising:
   obtaining a target distance from the display screen to a target user;
   obtaining a user image of the target user, where the user image includes a global image, a head image, and an eye image, and the global image is an image of a target space in front of the display screen;
   determining a first space where eyes of the target user are located from a plurality of preset subspaces within the target space based on the target distance and the global image; and
   determining a gaze position of the target user on the display screen corresponding to the first space and the user image of the target user based on a preset correspondence among the subspaces, user images, and screen coordinates on the display screen,
   wherein the determining a gaze position of the target user on the display screen further comprises:
   determining a pre-trained hierarchical coordinate prediction model for the first space which has been trained, where each of the subspaces have a pre-trained hierarchical coordinate prediction model which has been trained based on user images, screen coordinates of the gaze position of the user on the display screen, and a plurality of preset hierarchies; and
   inputting the user image of the target user into the hierarchical coordinate prediction model several times based on the number of hierarchies corresponding to the hierarchical coordinate prediction model to obtain the gaze position of the target user on the display screen under the corresponding hierarchy for each time;
   wherein increasing sub-areas into which the display screen is divided increases the number of the hierarchy.

2. The method according to claim 1, wherein the determining a gaze position of the target user further comprises:
   determining screen coordinates on the display screen corresponding to the first space and the user image of the target user based on the preset correspondence among the subspaces, the user images, and the screen coordinates on the display screen, where the display screen is divided into a plurality of sub-areas in advance based on a size of the display screen, and coordinates of a preset position in each of the sub-areas are used as screen coordinates of the sub-area; and
   determining the determined screen coordinates as the gaze position of the target user on the display screen.

3. The method according to claim 2, wherein the determining screen coordinates on the display screen corresponding to the first space and the user image of the target user further comprises:
   determining a pre-trained coordinate prediction model for the first space, where each of the subspaces has a pre-trained coordinate prediction model which has been trained based on the user images and screen coordinates of the gaze position of the user on the display screen; and
   obtaining the screen coordinates on the display screen corresponding to the user image of the target user by inputting the user image of the target user into the coordinate prediction model.

4. The method according to claim 3, wherein the coordinate prediction model is obtained by:
   constructing an initial coordinate prediction model for each of the subspaces;
   obtaining a labeled training data set for the subspace, the labeled training data set including a plurality of groups of training data that each include: a user image sample of a test user and a screen coordinate label corresponding to the user image sample, and the training data being labeled with the screen coordinate label; when the user image sample is collected for each of the subspaces, eyes of the test user are in that subspace; and the screen coordinate label represents screen coordinates corresponding to the gaze position of the test user on the display screen when the user image sample is collected, and the user image sample includes a global image sample, a head image sample, and an eye image sample;
   inputting the labeled training data set into the initial coordinate prediction model to obtain a prediction result; and
   adjusting parameters of the initial coordinate prediction model by comparing the obtained prediction result with a labelled value, until the model converges to obtain the pre-trained coordinate prediction model.

5. The method according to claim 1, wherein the plurality of subspaces are set by:
   dividing the target space into the plurality of subspaces based on a shooting angle range and an effective shooting distance of an image capturing device.

6. The method according to claim 5, wherein the plurality of subspaces are set by:
   dividing a horizontal shooting angle range of the image capturing device in a horizontal direction at a first preset angle interval to obtain a plurality of first subspaces in the horizontal direction;
   dividing a vertical shooting angle range of the image capturing device in a vertical direction at a second preset angle interval to obtain a plurality of second subspaces in the vertical direction;
   dividing the effective shooting distance of the image capturing device into third subspaces in a from-far-to-near direction at a preset distance interval; and
   determining subspaces obtained by intersecting and separating the first subspaces, the second subspaces, and the third subspaces as the subspaces into which the target space is divided.

7. The method according to claim 1, wherein the determining a first space where eyes of the target user are located further comprises:
   identifying a target partial image from the global image through a preset image recognition algorithm, the target partial image including the eyes of the target user;
   determining plane position information of the eyes of the target user on a first plane based on image position information of the target partial image in the global image, the first plane and a second plane where the display screen is located being parallel; and determining the first space where the eyes of the target user are located based on the plane position information and the target distance.

8. A device for determining a gaze position of a user that is applied to a terminal with a display screen, the device including a processor and a storage device for storing computer executable instructions that, when executed by the processor, cause the processor to perform operations comprising:
obtaining a target distance from the display screen to a target user;
obtaining a user image of the target user, the user image including a global image, a head image, and an eye image, and the global image being an image of a target space in front of the display screen;
determining a first space where eyes of the target user are located from a plurality of preset subspaces within the target space based on the target distance and the global image; and
determining a gaze position of the target user on the display screen corresponding to the first space and the user image of the target user, based on a preset correspondence among the subspaces, user images, and screen coordinates on the display screen,
wherein the processor performs operations further comprising obtaining a prediction result by:
determining a pre-trained hierarchical coordinate prediction model for the first space, where each of the subspaces have a pre-trained hierarchical coordinate prediction model which has been trained based on user images, screen coordinates of the gaze position of the user on the display screen, and a plurality of preset hierarchies; and
inputting the user image of the target user into the hierarchical coordinate prediction model for several times based on the number of hierarchies corresponding to the hierarchical coordinate prediction model to obtain the gaze position of the target user on the display screen under the corresponding hierarchy for each time,
wherein, the larger the number of the hierarchy, the more sub-areas into which the display screen is divided,
wherein the processor performs operations further comprising obtaining a prediction result by:
determining a pre-trained hierarchical coordinate prediction model for the first space, where each of the subspaces have a pre-trained hierarchical coordinate prediction model which has been trained based on user images, screen coordinates of the gaze position of the user on the display screen, and a plurality of preset hierarchies; and
inputting the user image of the target user into the hierarchical coordinate prediction model for several times based on the number of hierarchies corresponding to the hierarchical coordinate prediction model to obtain the gaze position of the target user on the display screen under the corresponding hierarchy for each time,
wherein, the larger the number of the hierarchy, the more sub-areas into which the display screen is divided.

9. The device according to claim 8, wherein the processor performs operations further comprising:
determining screen coordinates on the display screen corresponding to the first space and the user image of the target user based on the preset correspondence among the subspaces, the user images, and the screen coordinates on the display screen, the display screen being divided into a plurality of sub-areas in advance based on a size of the display screen, and coordinates of a preset position in each of the sub-areas are used as screen coordinates of the sub-area; and
determining the determined screen coordinates as the gaze position of the target user on the display screen.

10. The device according to claim 9, wherein the processor performs operations further comprising:
determining a pre-trained coordinate prediction model for the first space, each of the subspaces having a pre-trained coordinate prediction model which has been trained based on the user images and screen coordinates of the gaze position of the user on the display screen; and
obtaining the screen coordinates on the display screen corresponding to the user image of the target user by inputting the user image of the target user into the coordinate prediction model.

11. The device according to claim 10, wherein the pre-trained coordinate prediction model is obtained by:
constructing an initial coordinate prediction model for each of the subspaces;
obtaining a labeled training data set for the subspace the labeled training data set including a plurality of groups of training data, and each group of the training data includes: a user image sample of a test user and a screen coordinate label corresponding to the user image sample, and the training data is labeled with the screen coordinate label; when the user image sample is collected for each of the subspaces, eyes of the test user are in that subspace; and the screen coordinate label represents screen coordinates corresponding to the gaze position of the test user on the display screen when the user image sample is collected, and the user image sample includes: a global image sample, a head image sample, and an eye image sample;
inputting the labeled training data set into the initial coordinate prediction model to obtain a prediction result; and
adjusting parameters of the initial coordinate prediction model by comparing the obtained prediction result with a labelled value, until the initial coordinate prediction model converges to obtain the pre-trained coordinate prediction model.

12. The device according to claim 8, wherein the plurality of subspaces are set by:
dividing the target space into the plurality of subspaces based on a shooting angle range and an effective shooting distance of an image capturing device.

13. The device according to claim 12, wherein the plurality of subspaces are set by:
dividing a horizontal shooting angle range of the image capturing device in a horizontal direction at a first preset angle interval to obtain a plurality of first subspaces in the horizontal direction;
dividing a vertical shooting angle range of the image capturing device in a vertical direction at a second preset angle interval to obtain a plurality of second subspaces in the vertical direction;
dividing the effective shooting distance of the image capturing device into third subspaces in a from-far-to-near direction at a preset distance interval; and
determining subspaces obtained by intersecting and separating the first subspaces, the second subspaces, and the third subspaces as the subspaces into which the target space is divided.

14. The device according to claim 8, wherein the processor performs operations further comprising obtaining a prediction result by:

identifying a target partial image from the global image through a preset image recognition algorithm, the target partial image including the eyes of the target user;

determining plane position information of the eyes of the target user on a first plane based on image position information of the target partial image in the global image, the first plane and a second plane where the display screen is located being parallel; and determining the first space where the eyes of the target user are located based on the plane position information and the target distance.

15. A non-transitory computer-readable storage medium having computer program instructions stored thereon that, when executed by a processor, cause the processor to implement the method according to claim 1.

16. An electronic apparatus having a processor and a memory for storing executable instructions run on the processor, the processor being configured to run the executable instructions to execute a method for determining a gaze position of a user comprising:

obtaining a target distance from a display screen of the apparatus to a target user;

obtaining a user image of the target user, the user image including: a global image, a head image, and an eye image, and the global image is an image of a target space in front of the display screen;

determining a first space where eyes of the target user are located from a plurality of preset subspaces within the target space based on the target distance and the global image; and determining a gaze position of the target user on the display screen corresponding to the first space and the user image of the target user based on a preset correspondence among the subspaces, user images, and screen coordinates on the display screen, wherein the determining a gaze position of the target user on the display screen further comprises:

determining a pre-trained hierarchical coordinate prediction model for the first space which has been trained, where each of the subspaces have a pre-trained hierarchical coordinate prediction model which has been trained based on user images, screen coordinates of the gaze position of the user on the display screen, and a plurality of preset hierarchies; and inputting the user image of the target user into the hierarchical coordinate prediction model several times based on the number of hierarchies corresponding to the hierarchical coordinate prediction model to obtain the gaze position of the target user on the display screen under the corresponding hierarchy for each time;

wherein increasing sub-areas into which the display screen is divided increases the number of the hierarchy.

* * * * *